United States Patent
Shimizu et al.

(10) Patent No.: US 12,388,347 B2
(45) Date of Patent: Aug. 12, 2025

(54) POWER SUPPLY APPARATUS

(71) Applicant: ADVANTEST CORPORATION, Tokyo (JP)

(72) Inventors: Takahiko Shimizu, Tokyo (JP); Shoichiro Imai, Tokyo (JP)

(73) Assignee: ADVANTEST CORPORATION, Tokyo (JP)

( * ) Notice: Subject to any disclaimer, the term of this patent is extended or adjusted under 35 U.S.C. 154(b) by 293 days.

(21) Appl. No.: 18/312,000

(22) Filed: May 4, 2023

(65) Prior Publication Data

US 2023/0353055 A1 Nov. 2, 2023

Related U.S. Application Data

(63) Continuation of application No. PCT/JP2021/038779, filed on Oct. 20, 2021.

(30) Foreign Application Priority Data

Nov. 30, 2020 (JP) .................... 2020-198413

(51) Int. Cl.
*H02M 1/00* (2007.01)
*H02M 3/157* (2006.01)

(52) U.S. Cl.
CPC ....... *H02M 1/0077* (2021.05); *H02M 1/0009* (2021.05); *H02M 1/0016* (2021.05); *H02M 1/0067* (2021.05); *H02M 3/157* (2013.01)

(58) Field of Classification Search
CPC ............. H02M 3/1584; H02M 1/0009; H02M 1/0016; H02M 1/0025; H02M 1/0003; H02M 1/0077; H02M 1/0067
See application file for complete search history.

(56) References Cited

U.S. PATENT DOCUMENTS

2006/0034105 A1  2/2006  Tanaka et al.
2008/0238390 A1* 10/2008  Trivedi ............... H02M 3/1584
                                                 323/283
(Continued)

FOREIGN PATENT DOCUMENTS

CN    103858069 A    6/2014
CN    108173260 A    6/2018
(Continued)

OTHER PUBLICATIONS

International Search Report for International Application No. PCT/JP2021/038779; Mailing Date, Jan. 11, 2022.
(Continued)

*Primary Examiner* — Jue Zhang
*Assistant Examiner* — Lakaisha Jackson
(74) *Attorney, Agent, or Firm* — CANTOR COLBURN LLP (57) ABSTRACT

Power supply units of multiple channels each include an output stage that generates an output voltage across positive/negative outputs OUTP and OUTN, and a voltage detector that generates a voltage detection signal that indicates the output voltage. A feedback signal generating unit of the power supply unit of a master channel that is one of the multiple channels receives voltage detection signals from the power supply units of the remaining multiple channels, i.e., the slave channels, and generates a feedback signal based on the voltage detection signals of all the channels. A feedback controller generates a control signal such that the feedback signal approaches a target value. An output stage of each slave channel operates based on the control signal generated by the master channel.

11 Claims, 9 Drawing Sheets

(56) References Cited

U.S. PATENT DOCUMENTS

| | | | | |
|---|---|---|---|---|
| 2016/0218618 A1* | 7/2016 | Yin | ................... | H02M 3/33576 |
| 2019/0131874 A1* | 5/2019 | Saga | ..................... | H02M 3/158 |
| 2020/0295563 A1 | 9/2020 | Lu et al. | | |
| 2020/0343723 A1* | 10/2020 | Li | ..................... | H02M 3/33561 |
| 2022/0263400 A1* | 8/2022 | Yamaguchi | ........ | G01R 19/0023 |

FOREIGN PATENT DOCUMENTS

| | | | |
|---|---|---|---|
| CN | 109980926 A | 7/2019 |
| JP | S62221872 A | 9/1987 |
| JP | H01129718 A | 5/1989 |
| JP | H08289541 A | 11/1996 |
| JP | 2013138557 A | 7/2013 |
| JP | 2013535949 A | 9/2013 |
| JP | 2014147196 A | 8/2014 |
| JP | 2015065738 A | 4/2015 |
| JP | 2016208742 A | 12/2016 |
| JP | 2017127195 A | 7/2017 |

OTHER PUBLICATIONS

PCT International Preliminary Report on Patentability issued on May 30, 2023 with Written Opinion of the International Searching Authority for corresponding International Application No. PCT/JP2021/038779; Mailing Date, Jan. 11, 2022.

TW Notice of Examination Opinion for corresponding TW Application No. 110139696; Mailing Date, Jun. 8, 2022.

* cited by examiner

POWER SUPPLY APPARATUS

CROSS REFERENCES TO RELATED APPLICATIONS

This application is a continuation under 35 U.S.C. § 120 of PCT/JP2021/038779, filed Oct. 20, 2021, which is incorporated herein by reference, and which claimed priority to Japanese Application No. 2020-198413, filed Nov. 30, 2020. The present application likewise claims priority under 35 U.S.C. § 119 to Japanese Application No. 2020-198413, filed Nov. 30, 2020, the entire content of which is also incorporated herein by reference.

BACKGROUND

1. Technical Field

The present disclosure relates to a power supply apparatus configured to supply a power supply voltage or power supply current to a device.

2. Description of the Related Art

In recent years, in order to reduce power consumption, power devices such as silicon carbide (SiC) Field-Effect Transistors (FETs), gallium nitride (GaN) High Electron Mobility Transistors (HEMTs), etc., configured to provide high-speed high-voltage switching so as to enable high-efficiency power conversion, are in active research and development. In addition to such a demand, there is an increased demand for a test of a device that applies a high voltage. Also, there is an increased demand for reducing test time. Such a device test requires high-voltage, high-precision DC voltage application of 1000 V, and depending on the device, such a device test requires high-voltage, high-precision DC voltage application of 2000 V.

In a case in which the maximum output voltage of the power supply apparatus for such a test apparatus is lower than a high voltage to be supplied to a load, there is a need to couple multiple channels of power supply apparatuses (which will be referred to as "power supply units" hereafter) in series (which will be referred to as a "stack connection" hereafter).

Figure 1:
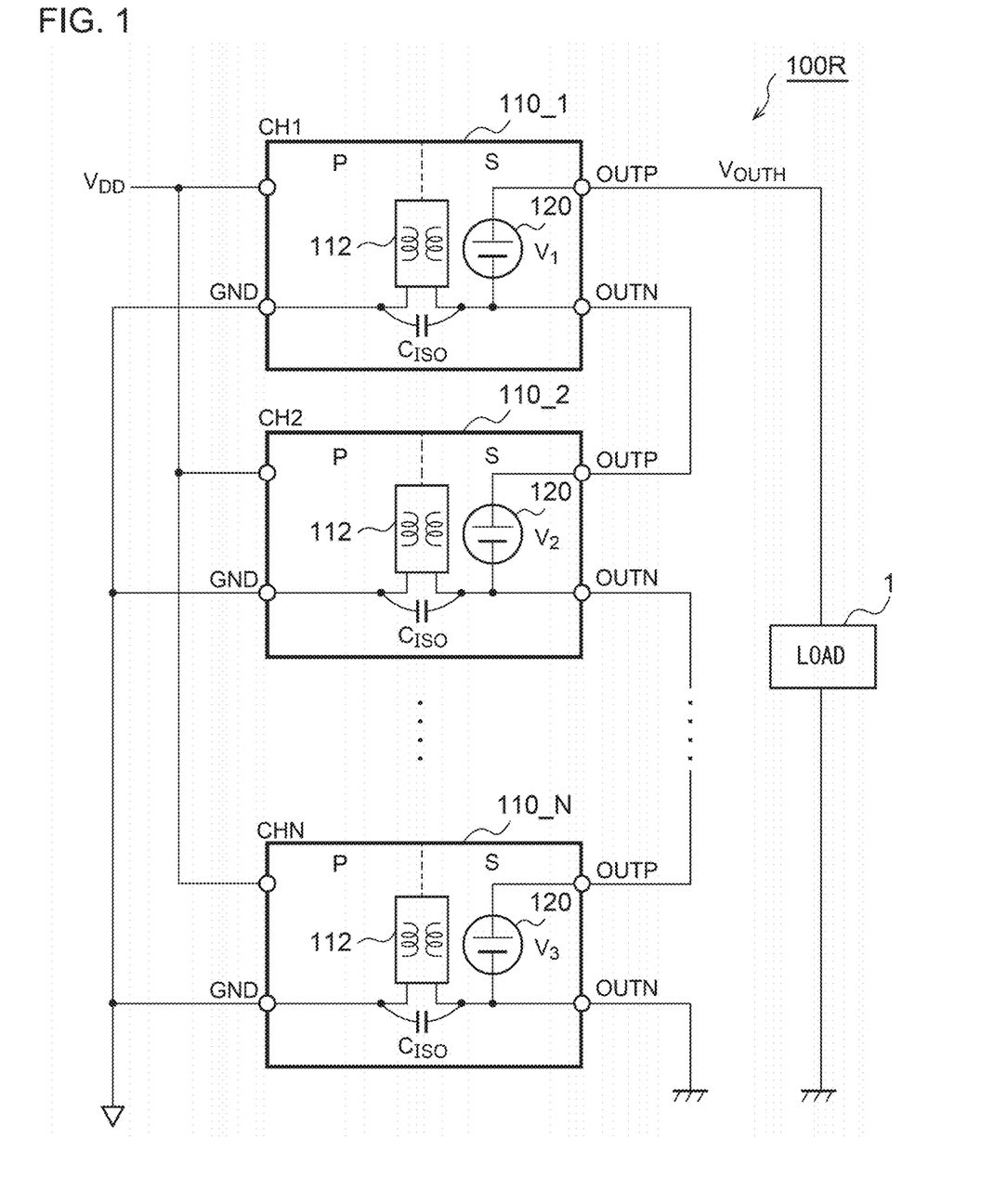
FIG. 1 is a block diagram of a high-voltage power supply.

FIG. 1 is a block diagram of a high-voltage power supply 100R. Referring to FIG. 1, the high-voltage power supply 100R includes multiple channels CH1 through CHN of power supply units 110_1 through 110_N coupled in a stack connection. Each channel of the power supply units 110 includes a primary side P and a secondary side S. The primary side P and the secondary side S are isolated via an isolation barrier 112 such as a transformer, capacitor, or the like. The ground terminals GND of the primary sides P of the multiple power supply units 110_1 through 110_N are coupled to each other so as to form a common GND.

The secondary side S of each power supply unit 110 is provided with a positive output OUTP and a negative output OUTN, and an output stage 120 arranged between the positive output OUTP and the negative output OUTN. In the configuration shown in FIG. 1, all the channels operate independently. The i-th (i=1 to N) channel of the output stage 120 is constant-voltage controlled such that the output voltage $V_i$ of the i-th channel itself approaches a target value $V_{REF}$.

The negative output OUTN of the power supply unit 110_i of the i-th channel (1≤i≤N−1) is coupled to the positive output OUTP of the power supply unit 110_(i+1) of the (i+1)-th channel. The positive output OUTP of the power supply unit 110_1 of the first channel is coupled to a load 1. The negative output OUTN of the power supply unit 110 of the N-th channel is grounded.

The high voltage $V_{OUTH}$ supplied across the load 1 is the sum of the voltages $V_1$ through $V_N$ of the output stages 120 of the respective channels and is represented by the following Expression.

$$V_{OUTH} = \Sigma_{1:N} V_i$$

In a steady state in which the voltages $V_1$ through $V_N$ are each stabilized to $V_{REF}$, the output voltage $V_{OUTH}$ is represented by $N \times V_{REF}$.

Figure 2A:
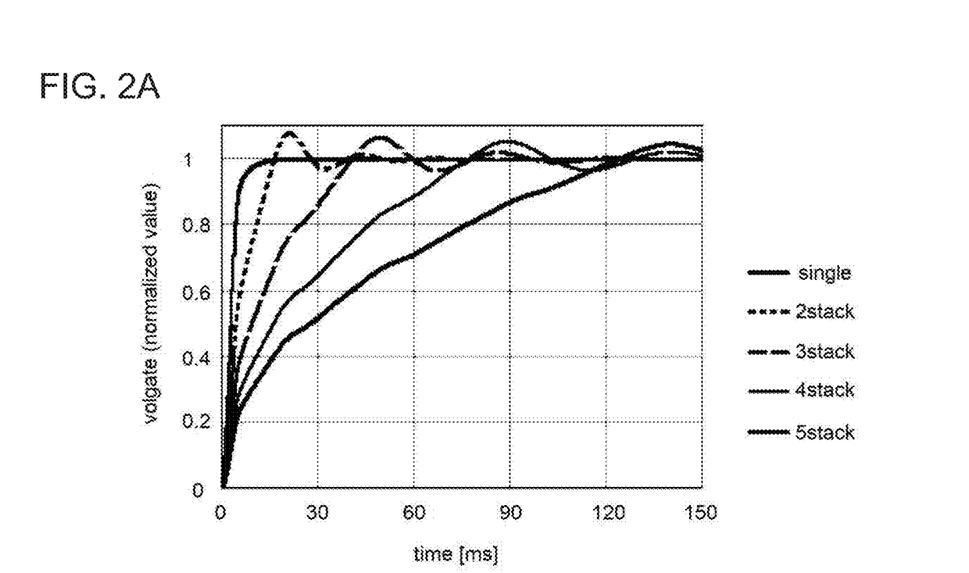
FIG. 2A is a waveform diagram (simulation results) of the output voltage of the high-voltage power supply.
Figure 2B:
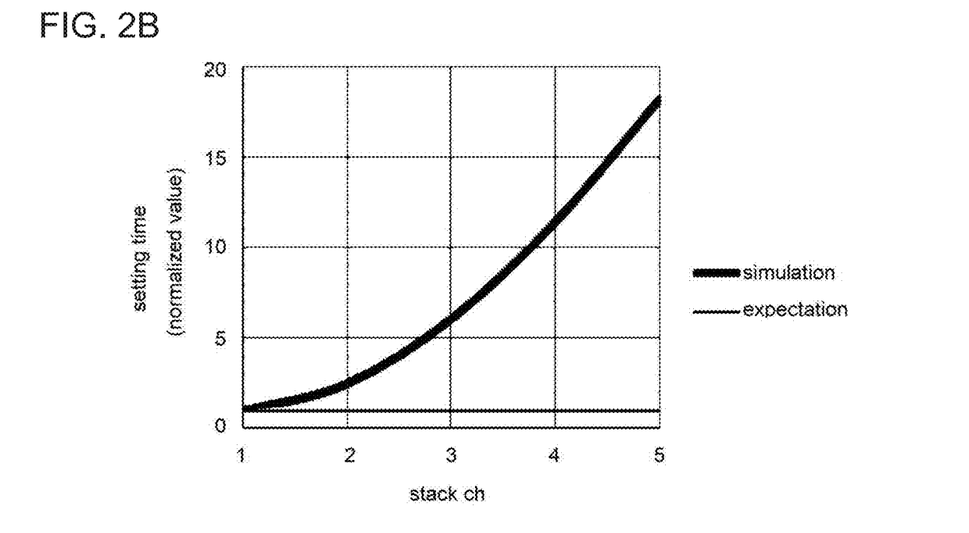
FIG. 2B is a diagram showing the relation between the number of stacked stages and the settling time.

Description will be made regarding a problem that occurs in a case in which the power supply units of multiple channels are coupled in a stack connection. FIG. 2A is a waveform diagram (simulation result) of the output voltage of a high-voltage power supply. FIG. 2B is a diagram showing a relation between the number of stacked stages N and the settling time. It should be noted that each voltage waveform is normalized by dividing the output voltage by a voltage level after settling. Here, "simulation" represents the relation between the number of stacked stages N and the settling time obtained based on the waveforms shown in FIG. 2A. As the number of the stacked stages N becomes larger, the settling time becomes longer. However, as represented by "expectation", the settling time is preferably maintained at a constant value regardless of the number of stacked stages N.

SUMMARY

An embodiment of the present disclosure has been made in view of such a situation.

A power supply apparatus according to an embodiment of the present disclosure includes multiple channels of power supply units coupled in a stack connection. The power supply units of the multiple channels each include: a positive output and a negative output; an output stage configured to generate an output voltage across the positive output and the negative output according to a control signal; and a voltage detector configured to generate a voltage detection signal that indicates the output voltage. The power supply unit of a master channel that is one from among the multiple channels further includes: a feedback signal generating unit configured to receive the voltage detection signal from the power supply units of slave channels that are the remaining channels of the multiple channels, and to generate a feedback signal based on the voltage detection signals of all the channels; and a feedback controller configured to generate the control signal such that the feedback signal approaches a target value. The output stages of all the channels operate based on the control signal generated by the feedback controller of the master channel.

An embodiment of the present disclosure relates to a power supply unit. The power supply unit is configured to allow a power supply apparatus to be formed by stacking multiple power supply units. The power supply units each include: a positive output and a negative output; an output stage configured to generate an output voltage across the positive output and the negative output according to a control signal; a voltage detector configured to generate a voltage detection signal that indicates the output voltage; a feedback signal generating unit configured such that, when the power supply unit is set to a master channel, the feedback signal generating unit is activated so as to generate a feedback signal based on the voltage detection signals of all the channels; a feedback controller configured such that, when the power supply unit is set to the master channel, the feedback controller is activated so as to generate a control signal such that the feedback signal approaches a target value; and an interface circuit configured such that, when the power supply unit is set to the master channel, the interface circuit receives the voltage detection signals from the other channels and transmits the control signal to the other channels, and such that, when the power supply unit is set to a slave channel, the interface circuit receives the control signal from the master channel, and outputs the voltage detection signal to the master channel.

It should be noted that any combination of the components described above or any component or any manifestation of the present disclosure may be mutually substituted between a method, apparatus, system, and so forth, which are also effective as an embodiment of the present disclosure.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Outline of Embodiments

Description will be made regarding the outline of several exemplary embodiments of the present disclosure. The outline is a simplified explanation regarding several concepts of one or multiple embodiments as a prelude to the detailed description described later in order to provide a basic understanding of the embodiments. That is to say, the outline described below is by no means intended to restrict the scope of the present invention and the present disclosure. Furthermore, the outline described below is by no means a comprehensive outline of all the possible embodiments. That is to say, the outline described below by no means restricts essential components of the embodiments. For convenience, in some cases, "one embodiment" as used in the present specification represents a single or multiple embodiments (examples and modifications) disclosed in the present specification.

First, description will be made regarding the results of investigations by the present inventors with respect to reasons why the settling time becomes longer as the number of stacked stages N becomes larger.

Figure 3:
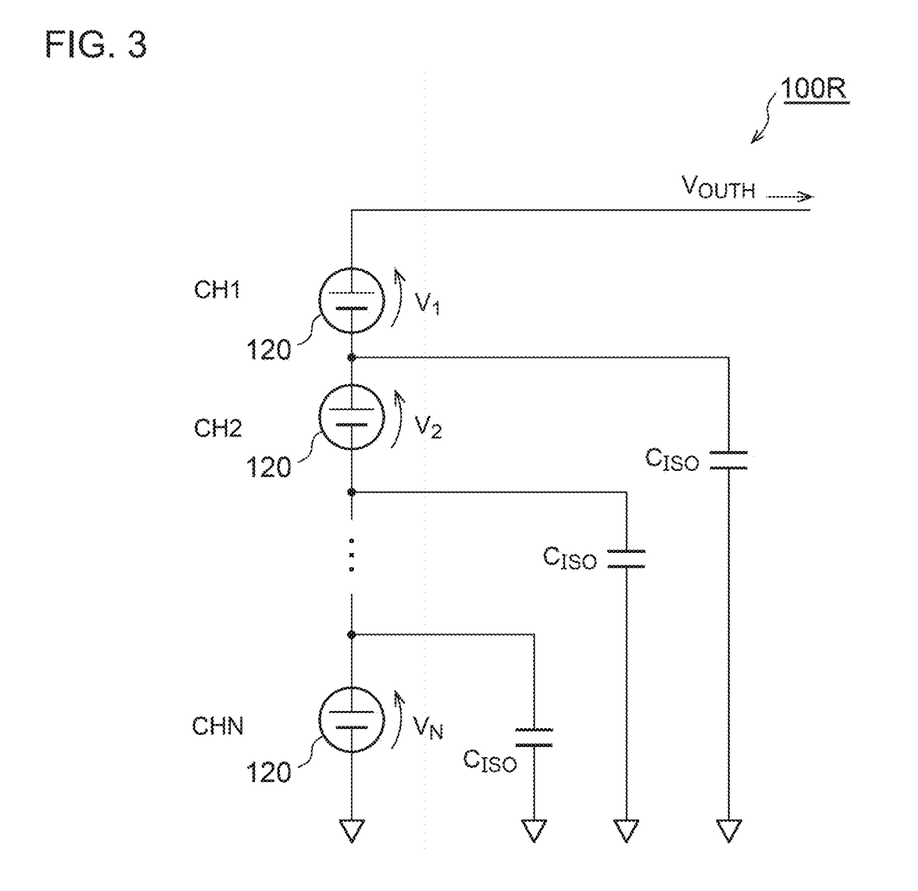
FIG. 3 is an equivalent circuit diagram of the high-voltage power supply shown in FIG. 1.

FIG. 3 is an equivalent circuit diagram of a high-voltage power supply 100R shown in FIG. 1. As shown in FIG. 1, the power supply unit 110 of each channel has an isolation capacitance $C_{ISO}$ between the ground terminal GND of the primary side P and the negative output OUTN of the secondary side S. As shown in FIG. 3, the isolation capacitance $C_{ISO}$ is coupled to the output stage 120 as an electrostatic capacitive load. As the number of stacked stages (number of channels) N becomes larger, the electrostatic capacitive load becomes larger.

There is a difference in the capacitance of the electrostatic capacitive load between the channels. Accordingly, there is variation in the settling performance between channels. The variation in the settling performance becomes a reason why the settling time of the output voltage $V_{OUTH}$ of the high-voltage power supply 100R becomes longer.

In addition, in many cases, each power supply unit 110 (output stage 120) is provided with a current clamp function (overcurrent protection function). Specifically, in a situation in which the output current of the output stage 120 of the power supply unit 110 is lower than a predetermined limit value, the constant voltage control is enabled. When the output current exceeds the limit value, the constant voltage control is disabled, and the output current is clamped to the limit value (which is also referred to as "current clamp control" or "constant current control").

In a case in which a voltage is applied in a condition in which there is an electrostatic capacitive load, inrush current flows into the electrostatic capacitive load. The output current of each output stage 120 is the sum of the load current that flows through the load and the inrush current. However, in some cases, there is a difference in the inrush current between channels. That is to say, the isolation capacitance $C_{ISO}$ of the first stage channel is not coupled to the corresponding output stage 120 as a capacitive load. Accordingly, inrush current does not readily occur. In contrast, in the second and subsequent stage channels, the electrostatic capacitance $C_{ISO}$ is coupled to the corresponding output stage 120 as a capacitive load. Accordingly, inrush current readily occurs.

If a large inrush current occurs in a part of the channels, the operation mode of the output stage 120 of the corresponding channel transits from the constant voltage control to the current clamp control. In a case in which channels that operate in the current clamp control mode and channels that operate in the constant voltage control mode coexist, as shown in FIG. 2A, inflection points occur in the output voltage $V_{OUTH}$ of the high-voltage power supply 100R, leading to a distorted waveform. In addition, as the number of stacked stages becomes larger, the electrostatic capacitance to be charged becomes larger. Accordingly, the slope at which the output voltage $V_{OUTH}$ rises becomes smaller. As a result, the settling time becomes longer.

Description will be made below regarding a technique for suppressing an increase in the settling time.

A power supply apparatus according to one embodiment includes multiple channels of power supply units coupled in a stack connection. The power supply units of the multiple channels each include: a positive output and a negative output; an output stage configured to generate an output voltage across the positive output and the negative output according to a control signal; and a voltage detector configured to generate a voltage detection signal that indicates the output voltage. The power supply unit of a master channel that is one from among the multiple channels further includes: a feedback signal generating unit configured to receive the voltage detection signal from the power supply units of slave channels that are the remaining channels of the multiple channels, and to generate a feedback signal based on the voltage detection signals of all the channels; and a feedback controller configured to generate the control signal such that the feedback signal approaches a target value. The output stages of all the channels operate based on the control signal generated by the feedback controller of the master channel.

With this configuration, the output stages of the power supply units of multiple channels each operate based on the same control signal. This is capable of resolving variation of the settling performance for each channel. This is capable of suppressing an increase in the settling time in a case in which the number of channels is increased.

With one embodiment, the power supply unit of the master channel may further include a current detector configured to generate a current detection signal that indicates an output current of the output stage. When the current detection signal exceeds a predetermined limit value, the feedback controller may generate the control signal such that the current detection signal approaches the limit value.

With the current clamp control, all the channels are activated at the same time, initiated by the master channel. This is capable of preventing a mixture of the current clamp control mode and the constant voltage control mode, thereby suppressing an increase in the settling time.

Also, the power supply units of the multiple channels have the same configuration each including the feedback signal generating unit, and the feedback controller. Each power supply unit may be selectively switchable between a master mode and a slave mode. Also, when a power supply unit is set to the master mode, the feedback signal generating unit and the feedback controller may be enabled. Also, when a power supply unit is set to the slave mode, the feedback signal generating unit and the feedback controller may be disabled. It should be noted that the "disabled state of a circuit block" is not limited to a state in which the circuit block is not operated, but also includes a disabled state of the circuit block in which the circuit block operates but the output thereof is blocked or masked.

By preparing multiple power supply units having the same configuration and rearranging the connection relation so as to appropriately set the modes, this allows the number of loads to be changed. For example, in a case in which the number of the power supply units is N, by stacking the N power supply units such that one power supply unit is set to the master mode and the remaining power supply units are set to the slave mode, such an arrangement is capable of supplying electric power to a single load. In contrast, by employing all the N power supply units independently as the master mode, this is capable of supplying electric power to N loads.

Also, the feedback signal may be an average value of the voltage detection signals of all the channels. With this, an accurate voltage can be generated giving consideration to variations of the characteristics of the output stages or voltage detectors of all the channels.

Also, the master channel may be an uppermost-stage channel from among the multiple channels. With such an arrangement in which the uppermost stage having the lowest potential for inrush current is employed as the master channel, this reduces the probability of application of the current clamp function, thereby allowing the settling time to be reduced.

A power supply unit according to one embodiment is configured to allow a power supply apparatus to be formed by stacking multiple power supply units. The power supply units each include: a positive output and a negative output; an output stage configured to generate an output voltage across the positive output and the negative output according to a control signal; a voltage detector configured to generate a voltage detection signal that indicates the output voltage; a feedback signal generating unit configured such that, when the power supply unit is set to the master channel, the feedback signal generating unit is activated so as to generate a feedback signal based on the voltage detection signals of all the channels; a feedback controller configured such that, when the power supply unit is set to the master channel, the feedback controller is activated so as to generate a control signal such that the feedback signal approaches a target value; and an interface circuit configured such that, when the power supply unit is set to the master channel, the interface circuit receives the voltage detection signals from the other channels and transmits the control signal to the other channels, and such that, when the power supply unit is set to a slave channel, the interface circuit receives the control signal from the master channel, and outputs the voltage detection signal to the master channel.

With this configuration, in a case in which multiple channels are stacked, the output stages of all the power supply units each operate based on the same control signal. Accordingly, this resolves variation of the settling performance of each channel. This suppresses an increase in the settling time in a case in which the number of channels is increased. Furthermore, by preparing multiple power supply units having the same configuration and rearranging the connection relation so as to appropriately set the modes, this allows the number of loads to be changed.

EMBODIMENTS

Description will be made below regarding preferred embodiments with reference to the drawings. The same or similar components, members, and processes are denoted by the same reference numerals, and redundant description thereof will be omitted as appropriate. The embodiments have been described for exemplary purposes only and are by no means intended to restrict the present disclosure or the present invention. Also, it is not necessarily essential for the present disclosure or the present invention that all the features or a combination thereof be provided as described in the embodiments.

In the present specification, the state represented by the phrase "the member A is coupled to the member B" includes a state in which the member A is indirectly coupled to the member B via another member that does not substantially affect the electrical connection between them, or that does not damage the functions or effects of the connection between them, in addition to a state in which they are physically and directly coupled.

Similarly, the state represented by the phrase "the member C is provided between the member A and the member B" includes a state in which the member A is indirectly coupled to the member C, or the member B is indirectly coupled to the member C, via another member that does not substantially affect the electrical connection between them, or that does not damage the functions or effects of the connection between them, in addition to a state in which they are directly coupled.

Figure 4:
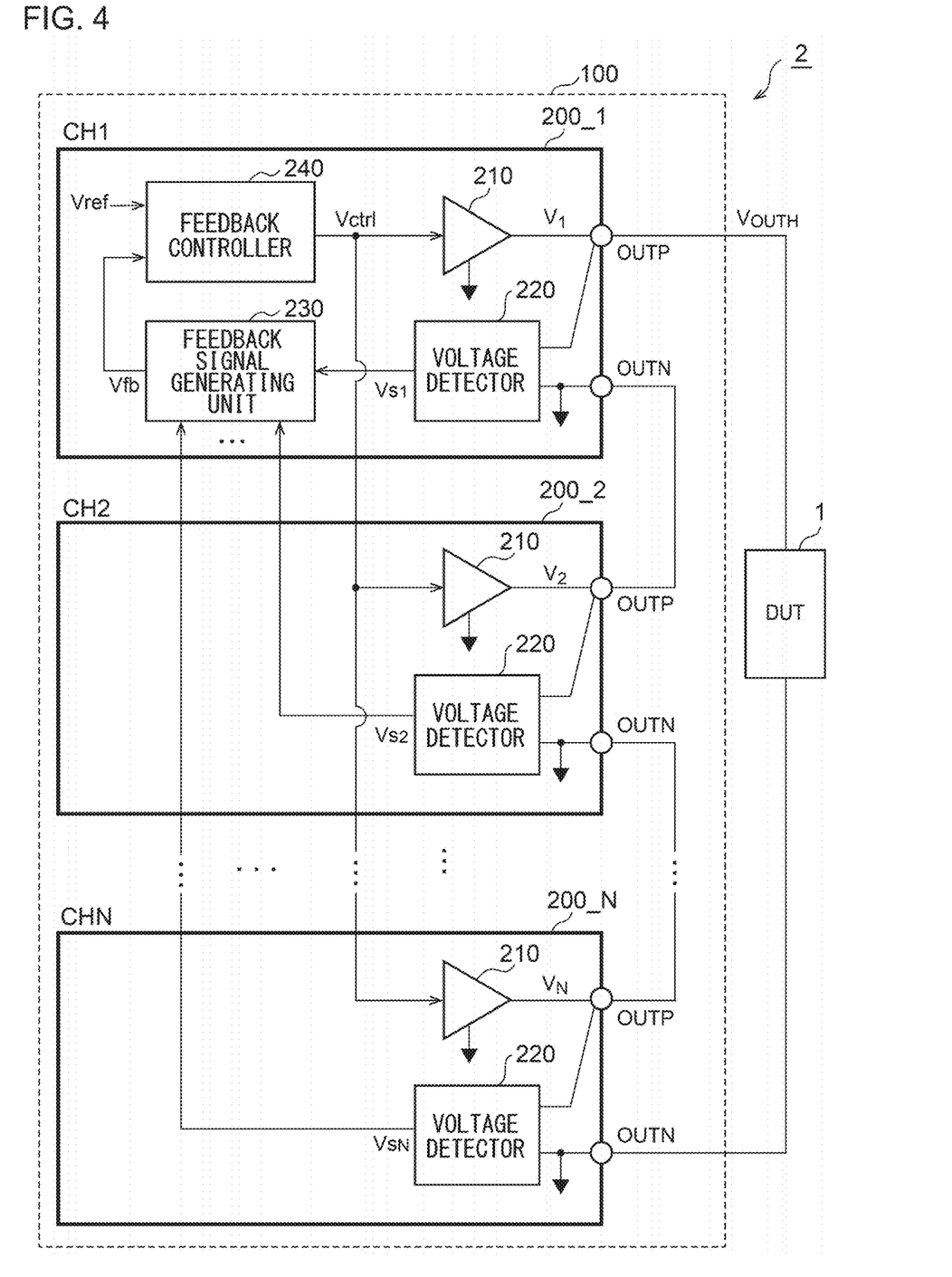
FIG. 4 is a block diagram showing a test apparatus provided with a power supply apparatus according to an embodiment.

FIG. 4 is a block diagram showing a test apparatus 2 provided with a power supply apparatus 100 according to an embodiment. The test apparatus 2 applies a test signal such as a voltage signal, current signal, or the like, to a device under test (DUT) 1, and measures a response of the DUT 1. The kind of the DUT 1 is not restricted in particular. Specifically, devices such as high-voltage transistors, power modules, etc., that require the application of a high voltage exceeding 1000 V, or circuits and circuit systems including such a device, are preferably selected as a test target of the test apparatus 2.

The test apparatus 2 is provided with the power supply apparatus 100 configured to supply a power supply signal to the DUT 1. Typically, the power supply signal is generated as a voltage signal $V_{OUTH}$ stabilized to a predetermined voltage level. It should be noted that FIG. 4 shows an arrangement in which the power supply signal $V_{OUTH}$ is directly supplied to the DUT 1. However, the present invention is not restricted to such an arrangement. Also, the power supply signal $V_{OUTH}$ may be supplied to a peripheral circuit of the DUT1, a circuit configured to drive the DUT1, or a circuit configured as an interface with the DUT 1.

The test apparatus 2 includes a voltage sensor or a current sensor, a signal generator or a driver, a comparator, an A/D converter, D/A converter, etc., in addition to the power supply apparatus 100. Such components are determined according to the kind of the DUT 1 or the test items and are not shown in FIG. 4.

The power supply apparatus 100 is provided with a plurality of N channels (CH1 through CHN) of power supply units 200_1 through 200_N coupled in a stack connection. Each power supply unit 200 includes a positive output OUTP and a negative output OUTN. In the same manner as the power supply unit 110 shown in FIG. 1, each power supply unit 200 includes a primary side and a secondary side that are isolated from each other. However, FIG. 4 shows only the configuration of the secondary side. The negative output OUTN provides a reference electric potential (ground) of the secondary side.

The negative output OUTN of the power supply unit 110_i of the i-th (1≤i≤N−1) channel is coupled to the positive output OUTP of the power supply unit 110 (i+1) of the (i+1)-th channel. The positive output OUTP of the power supply unit 110_1 of the first channel is coupled to a load 1. The negative output OUTN of the power supply unit 110 of the N-th channel is grounded.

The power supply units 200 of the multiple channels are each provided with an output stage 210 and a voltage detector 220. The output stage 210 of the i-th (1≤i≤N) power supply unit 200_i generates an output voltage $V_i$ across the positive output OUTP and the negative output OUTN according to a control signal Vctrl. Furthermore, the voltage detector 220 of the i-th power supply unit 200_i generates a voltage detection signal $V_{Si}$ that indicates the corresponding output voltage $V_i$.

In the present embodiment, from among the plurality of N channels CH1 through CHN, one is set as a master channel, and the other channels are set as slave channels. FIG. 4 shows an arrangement in which the first channel CH1 is set as the master channel and the second through N-th channels CH2 through CHN are set as slave channels. However, the present invention is not restricted to such an arrangement.

Such an arrangement is configured to enable signal transmission and reception between the master channel and the slave channels. The power supply units 200_2 through 200_N set as slave channels transmit voltage detection signals $V_{S1}$ through $V_{SN}$ to the power supply unit 200_1 set as the master channel.

The power supply unit 200_1 set as the master channel includes a feedback signal generating unit 230 and a feedback controller 240 in addition to the output stage 210 and the voltage detector 220.

The feedback signal generating unit 230 receives the voltage detection signals $V_{S2}$ through $V_{SN}$ from the power supply units 200_2 through 200_N set as slave channels and generates a feedback signal Vfb based on the voltage detection signals $V_{S1}$ through $V_{SN}$ of all the channels CH1 through CHN. For example, the feedback signal Vfb may be a simple average value of the multiple voltage detection signals $V_{S1}$ through $V_{SN}$. It should be noted that the feedback signal Vfb is not restricted to such a value.

For example, in a case in which there is variation in the power supply units 200_1 through 200_N of the multiple channels, a weighted average may be calculated using coefficients giving consideration to the variation.

The feedback controller 240 receives the input of a target value Vref. The feedback controller 240 feedback-controls the signal level (magnitude) of the control signal Vctrl such that the feedback signal Vfb approaches the target value Vref.

The control signal Vctrl generated by the feedback controller 240 is supplied to the output stage 210 of the master channel. Furthermore, the control signal Vctrl is transmitted from the power supply unit 200_1 of the master channel to the power supply units 200_2 through 200_N of the slave channels. With this, the output stages 210 of all the channels CH1 through CHN each operate based on the control signal Vctrl generated by the feedback controller 240 of the master channel CH1.

The above is the basic configuration of the power supply apparatus 100.

With this configuration, the power supply units 200_1 through 200_N of the multiple channels CH1 through CHN operate based on the same control signal Vctrl. Accordingly, this is capable of resolving variation of the settling performance that occurs in each channel. This is capable of suppressing an increase in the settling time when the number of channels N is increased.

The present disclosure encompasses various kinds of apparatuses and methods that can be regarded as a block configuration or a circuit configuration shown in FIG. 4, or otherwise that can be derived from the aforementioned description. That is to say, the present invention or the present disclosure is not restricted to a specific configuration. More specific description will be made below regarding example configurations and examples for clarification and ease of understanding of the essence of the present invention and the operation thereof. That is to say, the following description will by no means be intended to restrict the technical scope of the present invention.

Example 1

Figure 5:
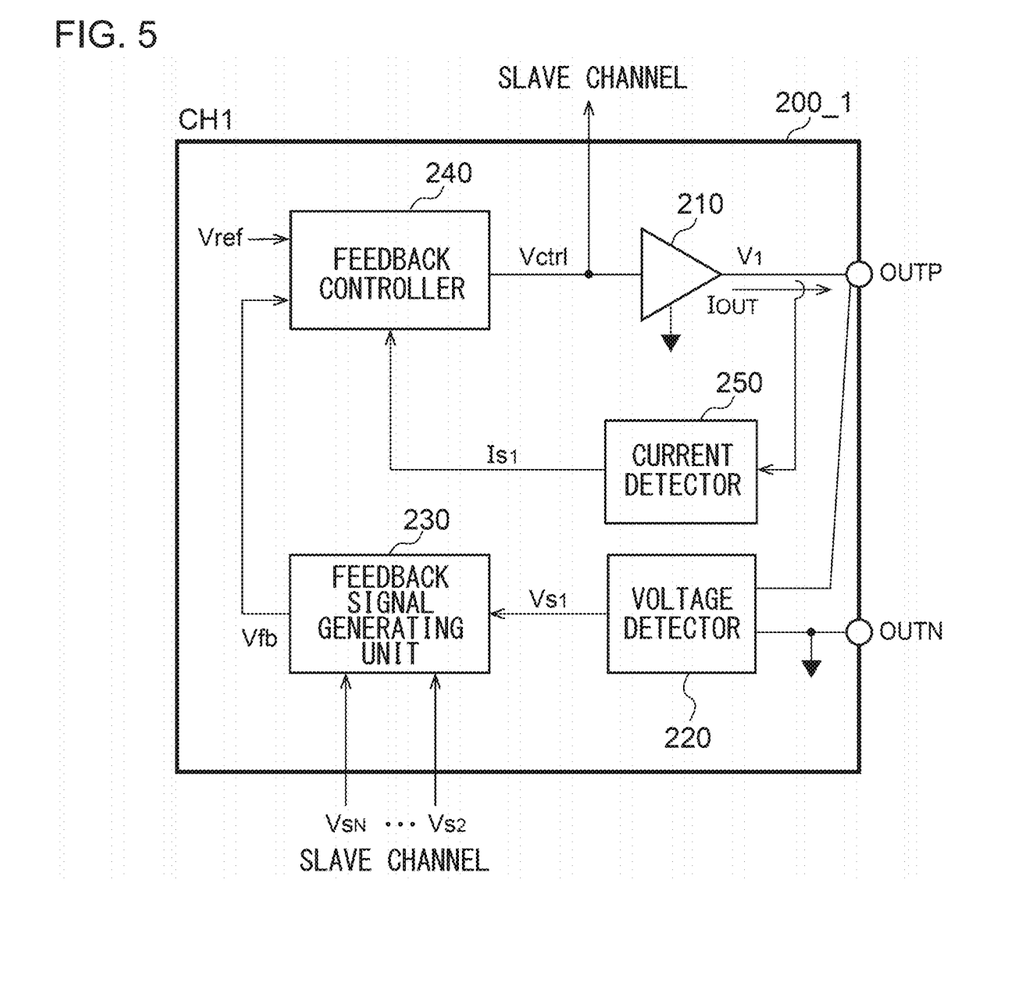
FIG. 5 is a block diagram showing an example configuration of a power supply unit of a master channel according to an example 1.

FIG. 5 is a block diagram showing an example configuration of the power supply unit 200_1 of the master channel according to an example 1. The power supply unit 200_1 has a current clamp function. Specifically, in addition to the power supply unit 200_1 shown in FIG. 4, the power supply unit 200_1 includes a current detector 250. The current detector 250 generates a current detection signal $I_{S1}$ that indicates the output current $I_{OUT}$ of the output stage 210. The current detection signal $I_{S1}$ is input to the feedback controller 240.

In a state in which the current detection signal $I_{S1}$ is lower than a predetermined limit value, the feedback controller 240 generates the control signal Vctrl such that the feedback signal Vfb approaches the target value Vref as described above (constant voltage control). In contrast, in a state in which the current detection signal $I_{S1}$ exceeds the limit value, the constant voltage control is disabled. In this state, the feedback controller 240 generates the control signal Vctrl such that the current detection signal $I_{S1}$ approaches a limit value (current clamp control).

The hardware component relating to the current clamp function is provided to only the master channel. Alternatively, as described later, in a case in which each slave channel is provided with the hardware component relating to the current clamp function, the hardware component provided in each slave channel is disabled.

When the current detection signal $I_{S1}$ exceeds the limit value in the master channel, the control signal Vctrl to be used for the current clamp control is generated. With this, the output stages 210 of all the channels operate. That is to say, the current clamp control is initiated by the master channel and is enabled for all the channels at the same time. Accordingly, this is capable of preventing mixing of the current clamp control and the constant voltage control that occurs in the configuration shown in FIG. 1, thereby suppressing an increase of the settling time.

It should be noted that, as described above with reference to FIG. 3, in a case in which multiple channels are stacked, the channels on the highest electric potential side are less susceptible to the effects of the isolation capacitance $C_{ISO}$. Accordingly, it can be said that, with such an arrangement, inrush current does not readily occur. Accordingly, in a case in which the current clamp function is implemented in the master channel, the highest-stage channel in which inrush current does not readily occur is employed as the master channel. This reduces the probability that the current clamp will be applied, thereby further reducing the settling time.

Example 2

The power supply unit 200 of the master channel and the power supply units 200 of the slave channels may be designed as separate configurations from the start. Also, as described below, the power supply unit 200 of the master channel and the power supply units 200 of the slave channels may be designed as the same configuration. Also, each power supply unit 200 may be configured to be capable of switching its operating mode between a mode in which it is operated as a master-channel power supply and a mode in which it is operated as a slave-channel power supply.

Figure 6:
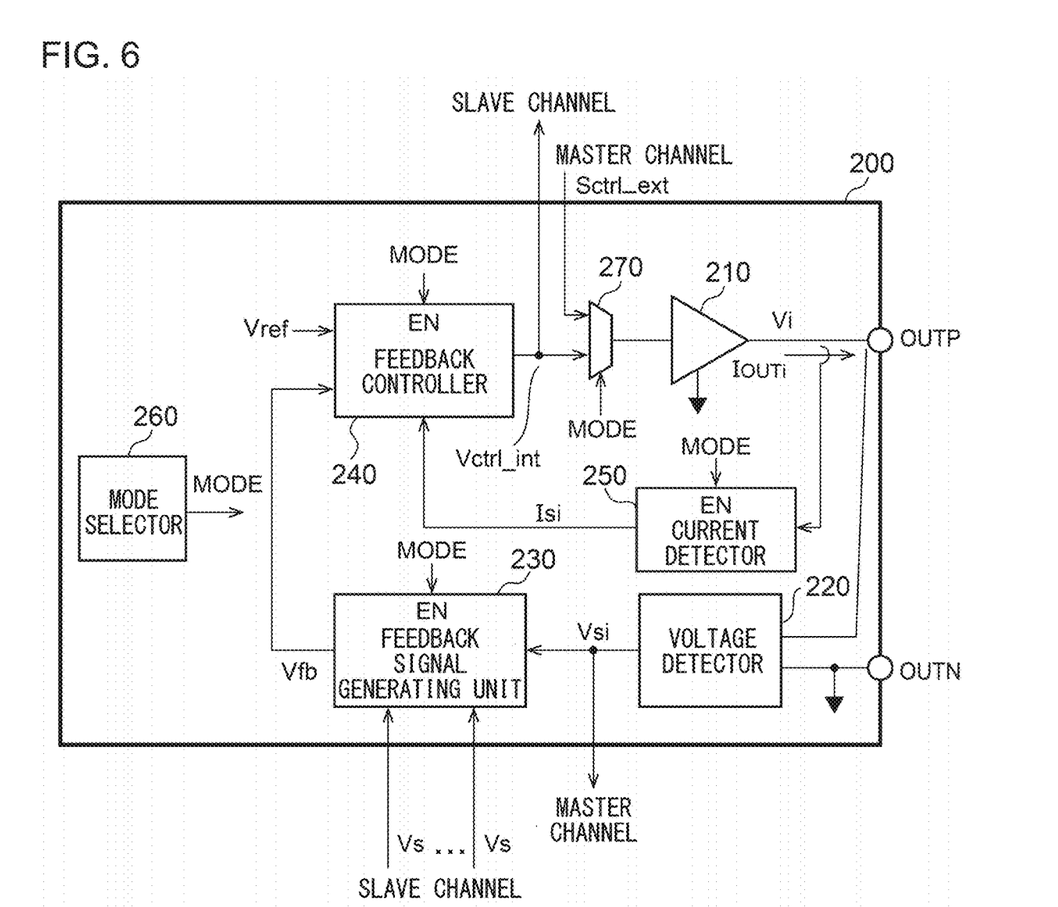
FIG. 6 is a block diagram of a power supply unit according to an example 2.

FIG. 6 is a block diagram of the power supply unit 200 according to an example 2. The power supply unit 200 can be used as both a master-channel power supply and as a slave-channel power supply. The power supply unit 200 includes a mode selector 260 and a multiplexer (switch) 270.

The mode selector 260 generates a mode control signal MODE that indicates a master mode when the power supply unit 200 is used for the master channel and a slave mode when the power supply unit 200 is used for a slave channel. The mode control signal MODE is input to the feedback signal generating unit 230, the feedback controller 240, and an enable terminal of the current detector 250. When the mode control signal MODE indicates the master mode, these blocks are enabled. When the mode control signal MODE indicates the slave mode, these blocks are disabled.

One input node of the multiplexer 270 is coupled to the output of the feedback controller 240 included in the same power supply unit 200. Furthermore, the other input node of the multiplexer 270 is configured to receive an input of the control signal Vctrl generated by a different power supply unit 200. When the mode control signal MODE indicates the master mode, the multiplexer 270 selects a control signal (internal control signal) Vctrl_int generated by the same power supply unit 200. When the mode control signal MODE indicates the slave mode, the multiplexer 270 selects an external control signal Vctrl_ext generated by a different power supply unit 200.

Furthermore, the power supply unit 200 is configured to be capable of outputting the control signal Vctrl_int and the voltage detection signal $V_{Si}$ generated by an internal component thereof to an external circuit. Moreover, the power supply unit 200 is configured to be capable of receiving the control signal Vctrl_ext and the voltage detection signal $V_{Si}$ generated by an external circuit.

Figure 7A:
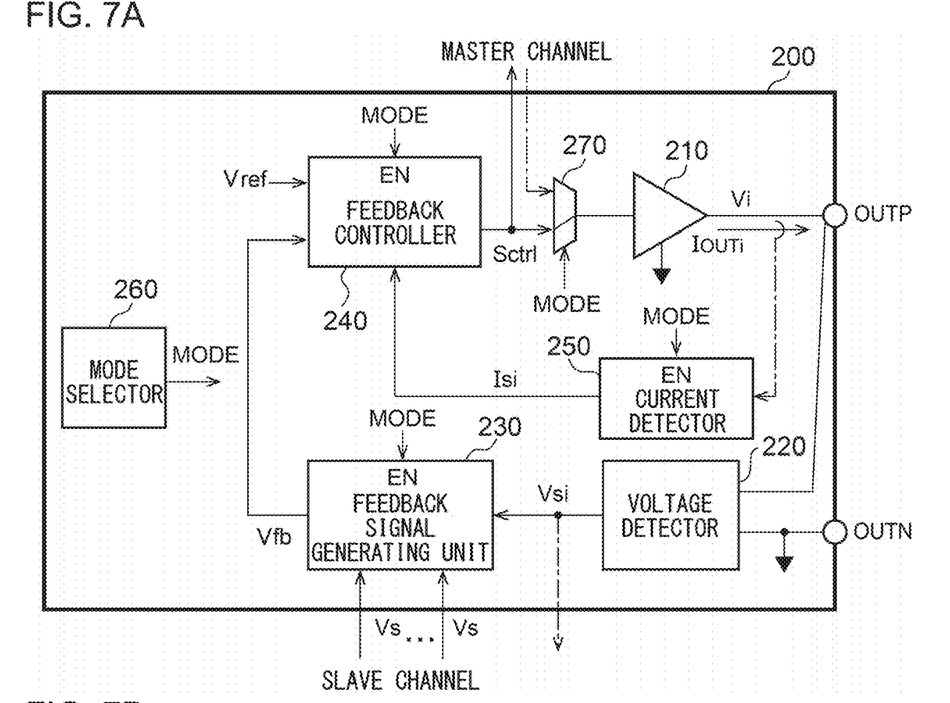
FIG. 7A and FIG. 7B are diagrams showing the master-mode and the slave-mode states of the power supply unit shown in FIG. 6.
Figure 7B:
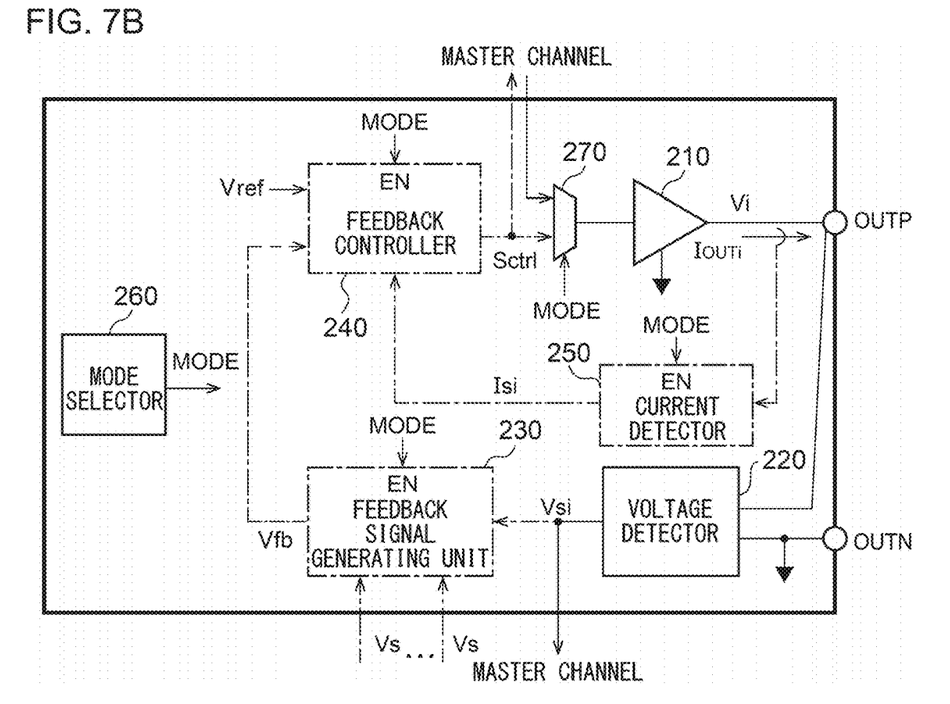

FIG. 7A and FIG. 7B are diagrams showing a master-mode state and a slave-mode state of the power supply unit 200 shown in FIG. 6. In FIG. 7A and FIG. 7B, disabled blocks and signal lines are indicated by lines of alternately long and short dashes.

Figure 8:
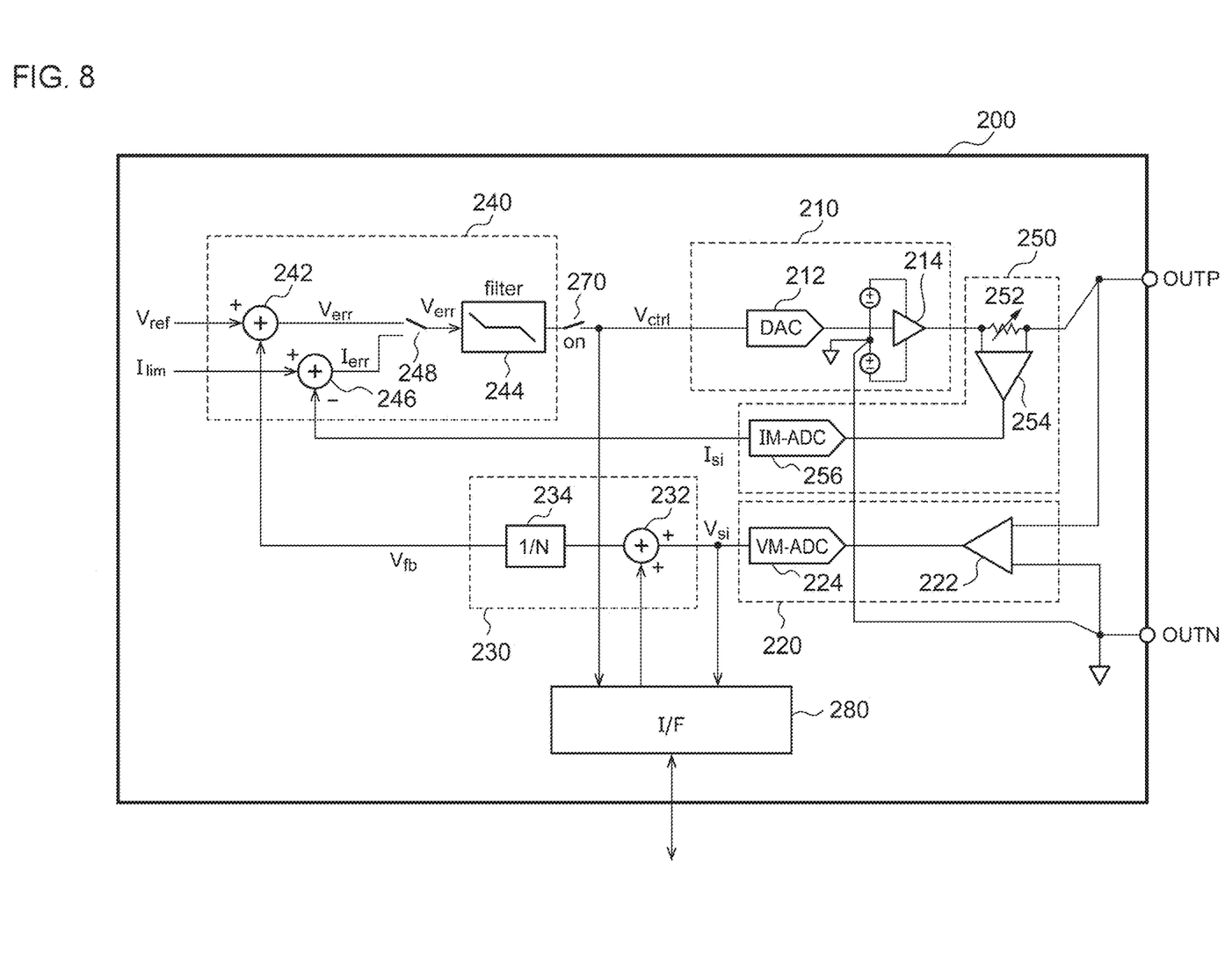
FIG. 8 is a block diagram showing a specific example configuration of the power supply unit.

FIG. 8 is a block diagram showing a specific example configuration of the power supply unit 200. The control system of the power supply unit 200 is configured in a digital circuit architecture. The detection signal and the control signal are each generated as a digital signal.

The output stage 210 includes a D/A converter 212 and a power amplifier 214. The output stage 210 converts the input digital control signal Vctrl into an analog control signal. The power amplifier 214 amplifies an analog control signal, and outputs the analog control signal thus amplified to the positive output OUTP.

The voltage detector 220 includes a voltage sense amplifier 222 and an A/D converter 224. The voltage sense amplifier 222 amplifies the voltage $V_i$ across the two outputs OUTPT and OUTN. The A/D converter 224 converts the output of the sense amplifier 222 into a digital voltage detection signal $V_{Si}$. The voltage detection signal $V_{Si}$ can be shared with the other channels via an interface circuit 280.

The feedback signal generating unit 230 includes an adder/subtractor 232 and a divider 234. The adder/subtractor 232 adds the voltage detection signal $V_{Si}$ of the same channel and the voltage detection signals $V_{Si}$ of the other channels. The divider 234 divides the output of the adder/subtractor 232 by the number of channels N, so as to generate the feedback signal Vfb based on the average value. The divider 234 can also be regarded as a coefficient circuit that multiplies the output of the adder/subtractor 232 by a coefficient 1/N.

The current detector 250 includes a sense resistor 252, a sense amplifier 254, and an A/D converter 256. The sense resistor 252 is provided on a path of the output current $I_{OUT}$ of the output stage 210. A voltage drop occurs across the sense resistor 252 in proportion to the output current $I_{OUT}$. The sense amplifier 254 amplifies the voltage drop across the sense resistor 252. The A/D converter 256 converts the output of the sense amplifier 254 into the digital current detection signal $Is_i$. The voltage target value Vref and the current limit value Ilim are input to the feedback controller 240.

The adder/subtractor 242 generates the difference (voltage error Verr) between the target value Vref and the feedback signal Vfb. The adder/subtractor 246 generates the difference (current error Ierr) between the limit value Ilim and the current detection signal $Is_t$.

When $Is_t$<Ilim, the selector 248 selects the voltage error Verr (constant voltage control). When $Is_t$>Ilim, the selector 248 selects the current error Ierr (current clamp control).

A filter 244 generates the control signal Vctrl based on the output of the selector 248. The filter 244 may be configured of a Proportional Integral (PI) controller, a Proportional Integral Derivative (PID) controller, or the like. In the constant voltage control, the control signal Vctrl level is adjusted by feedback control such that the voltage error Verr approaches zero. In the current clamp control, the control signal Vctrl level is adjusted by feedback control such that the current error Ierr approaches zero. The parameters of the filter 244 may be switched according to switching between the constant voltage control and the current clamp control.

The feedback controller 240 and the feedback signal generating unit 230 may each be configured as a Central Processing Unit (CPU), Digital Signal Processor (DSP), Field Programmable Gate Array (FPGA), or the like.

The interface circuit 280 is capable of transmitting and receiving the voltage detection signal and the control signal Vctrl to and from the interface circuits 280 of the other channels.

Figure 9:
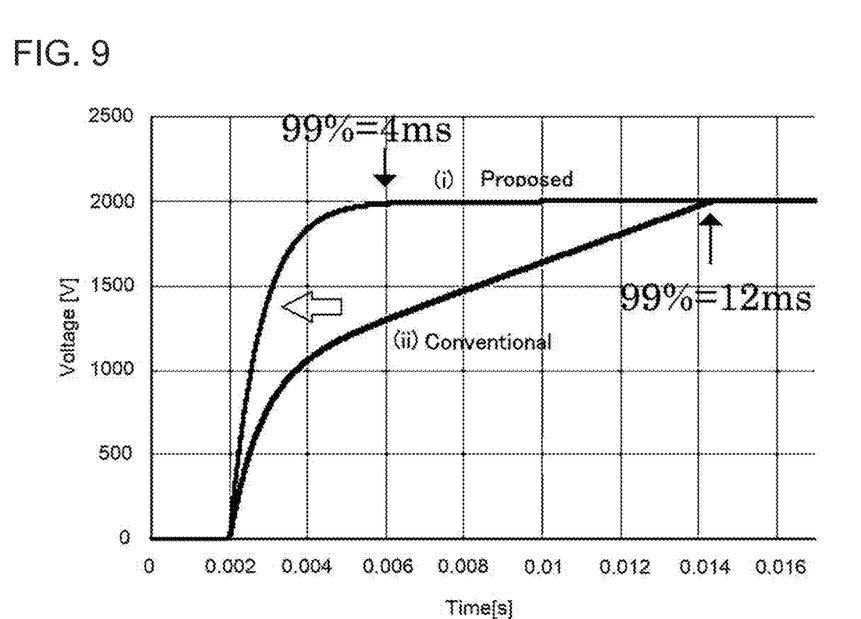
FIG. 9 is an operation waveform diagram of a power supply apparatus configured as a combination of two power supply units shown in FIG. 8.

FIG. 9 is an operation waveform diagram of a power supply apparatus configured as a combination of the two power supply units 200 shown in FIG. 8. A waveform of a power supply apparatus according to the embodiment and a waveform of a conventional power supply apparatus are shown. Two power supply units each configured as a 1000-V output stage are stacked so as to provide a two-channel system configured to provide a 2000-V output. With the waveform (ii) provided using the conventional method, the output rises at high speed immediately after the voltage is applied. However, after the output exceeds approximately 1000 V, the output rises at a reduced speed. This is because a settling waveform is generated by the upper-stage channel operating in the voltage application control mode and the lower-stage channel operating in the current clamp control mode due to inrush current flowing into the electrostatic capacitance, leading to an increase in the settling time. In contrast, it can be understood that the waveform (i) according to the embodiment is formed by both channels operating in the voltage application control mode while maintaining a balance between them, thereby providing reduced settling time. It has been confirmed that, with the present embodiment, this allows the settling time to 2000 V to be reduced from 12 ms provided using a conventional method to 4 ms, i.e., to be reduced to ⅓ or less of the settling time provided by a conventional arrangement.

Description has been made regarding the present disclosure with reference to the embodiments. The above-described embodiments have been described for exemplary purposes only. Rather, various modifications may be made by making various combinations of the aforementioned components or processes. Description will be made below regarding such modifications.

Description has been made with reference to FIG. 8 regarding the power supply unit 200 provided with a control system configured in a digital circuit architecture. However, the present invention is not restricted to such an arrangement. Also, the control system may be configured as an analog circuit.

Description has been made regarding the current clamp function for monitoring the output current in the master channel. However, the present invention is not restricted to such an arrangement. For example, an arrangement may be made in which the output current of a given slave channel is monitored, and the current detection value thus obtained for the slave channel is transmitted to the master channel. Also, the feedback controller 240 of the master channel may apply the current clamp control based on the current detection signal Is obtained for the slave channel.

Alternatively, the current detectors of all the channels may be enabled. Also, the current detection signal may be transmitted from each slave channel to the master channel. Also, the feedback controller 240 of the master channel may apply the current clamp control such that the maximum value of the current detection signals of all the channels does not exceed the limit value Ilim.

The embodiments show only the mechanisms and applications of the present invention for exemplary purposes only and are by no means intended to be interpreted restrictively. Rather, various modifications and various changes in the layout can be made without departing from the spirit and scope of the present invention defined in appended claims.

What is claimed is:

1. A power supply apparatus comprising a plurality of channels of power supply units coupled in a stack connection,
    wherein the power supply units of the plurality of channels each comprise:
        a positive output and a negative output;
        an output stage structured to generate an output voltage across the positive output and the negative output according to a control signal; and
        a voltage detector structured to generate a voltage detection signal that indicates the output voltage,
    wherein the power supply unit of a master channel that is one from among the plurality of channels further comprises:
        a feedback signal generating unit structured to receive the voltage detection signal from the power supply units of slave channels that are the remaining channels of the plurality of channels, and to generate a feedback signal based on the voltage detection signals of all the channels; and
        a feedback controller structured to generate the control signal such that the feedback signal approaches a target value,
    and wherein the output stages of all the channels operate based on the control signal generated by the feedback controller of the master channel.

2. The power supply apparatus according to claim 1, wherein the power supply unit of the master channel further comprises a current detector structured to generate a current detection signal that indicates an output current of the output stage,
    and wherein, when the current detection signal exceeds a predetermined limit value, the feedback controller generates the control signal such that the current detection signal approaches the limit value.

3. The power supply apparatus according to claim 2, wherein the power supply units of the plurality of channels have the same configuration each comprising the feedback signal generating unit, the feedback controller, and the current detector,
    wherein each power supply unit is selectively switchable between a master mode and a slave mode,
    wherein, when a power supply unit is set to the master mode, the feedback signal generating unit and the feedback controller are enabled, and wherein, when a power supply unit is set to the slave mode, the feedback signal generating unit and the feedback controller are disabled.

4. The power supply apparatus according to claim 1, wherein the feedback signal is an average value of the voltage detection signals of all the channels.

5. The power supply apparatus according to claim 1, wherein the master channel is an uppermost-stage channel from among the plurality of channels.

6. A test apparatus provided with the power supply apparatus according to claim 1, structured to supply electric power to a device under test.

7. A power supply unit structured to allow a power supply apparatus to be formed by stacking a plurality of power supply units, the power supply units each comprising:
   a positive output and a negative output;
   an output stage structured to generate an output voltage across the positive output and the negative output according to a control signal;
   a voltage detector structured to generate a voltage detection signal that indicates the output voltage;
   a feedback signal generating unit structured such that, when the power supply unit is set to a master channel, the feedback signal generating unit is activated so as to generate a feedback signal based on the voltage detection signals of all the channels;
   a feedback controller structured such that, when the power supply unit is set to the master channel, the feedback controller is activated so as to generate a control signal such that the feedback signal approaches a target value; and
   an interface circuit structured such that, when the power supply unit is set to the master channel, the interface circuit receives the voltage detection signals from the other channels and transmits the control signal to the other channels, and such that, when the power supply unit is set to a slave channel, the interface circuit receives the control signal from the master channel, and outputs the voltage detection signal to the master channel.

8. The power supply unit according to claim 7, further comprising a current detector structured to generate a current detection signal that indicates an output current of the output stage;
   wherein, when the power supply unit is set to the master channel, and when the current detection signal exceeds a predetermined limit value, the feedback controller generates the control signal such that the current detection signal approaches the limit value.

9. The power supply unit according to claim 7, wherein the feedback signal is an average value of the voltage detection signals of all the channels.

10. A power supply apparatus structured by coupling in a stack connection a plurality of power supply units according to claim 7.

11. A test apparatus provided with the power supply apparatus according to claim 10, structured to supply electric power to a device under test.

* * * * *